Patented Apr. 12, 1932

1,853,352

UNITED STATES PATENT OFFICE

CLYDE O. HENKE AND HENRY J. WEILAND, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

ABIETENE SULPHONIC ACID AND PROCESS OF PREPARING THE SAME

No Drawing.    Application filed October 16, 1929.    Serial No. 400,151.

This invention relates to the sulfonic acids prepared by sulfonating abietene, which is obtainable either by the pyrogenic decomposition of wood rosin or abietic acid or by the catalytic decomposition of abietic acid containing material, as disclosed in co-pending applications, Serial No. 348,123, by Gubelmann and Henke, filed March 18, 1929, wherein abietic acid containing material, in vapor phase, is passed over activated charcoal or other catalysts at temperatures between 400 and 600° C., and Serial No. 388,616, by Palmer, Oliver, and Burda, filed August 26, 1929, wherein rosin is heated in the presence of fuller's earth at temperatures below that at which destructive decomposition occurs. The invention also comprehends the method of sulfonating abietene, and the method of separating the product from the sulfonation mass.

It is accordingly an object of this invention to provide a novel method for forming sulfonic acids of abietene.

It is also an object of this invention to provide a method of isolating the sulfonic acids formed.

Other and further important objects will become apparent from the following disclosure and appended claims.

The new sulfonic acid products either in the form of acid aqueous solutions or in the form of their water soluble salts possess remarkable properties as regards surface tension and capillarity effects in solution. They are highly adapted for use as emulsifying and solubilizing agents for water immiscible or only slightly miscible solvents. They may be employed either, as indicated above, or in combination with water miscible or immiscible alcohols, ketones or the like, as pasting, cleansing, lathering, wetting or fulling agents in dye, paper, textile and leather industries. They may be used in acid, neutral, or alkaline baths, and, therefore, find application in the laundering, dyeing, bleaching, carbonizing, mercerizing and finishing of textiles. They have also been found to be useful in connection with other agents as protective colloids and dispersing agents. However, it should be understood that we do not claim to be the first or exclusive inventors of the above various uses and applications.

We have found that abietene can be sulfonated in various strengths of sulfuric acid. The amount of acid necessary to complete sulfonation is directly dependent upon the strength of acid employed. For example, a longer time and more acid is necessary in sulfonating with sulfuric acid (93%) than is the case if sulfuric monohydrate is employed. On the other hand, even less acid is necessary if the sulfonation is carried out with a mixture of sulfuric monohydrate and 25% oleum. Sulfuric acids of less strength than (93%) require such a long period of time for effecting sulfonation that their use on a commercial basis is highly impractical.

Although, the proportion and strength of sulfuric acid employed as sulfonating agent may vary widely, the same is not true of the temperature at which sulfonation is carried out. In order to procure the best results, it is necessary to restrict the temperature to within a rather narrow range.

We prefer to carry out the reactions below room temperature, that is, around 0 to 15° C. Sulfonation takes place below 0° C., but the reaction proceeds slower at such temperatures. On the other hand, if the sulfonation is carried out at temperatures higher than 25° C. the product obtained is considerably darker in color. At temperatures above 50° C. the evolution of $SO_2$ takes place rapidly with a corresponding darkening of the mass. At 75 to 80° C., the evolution of $SO_2$ and the darkening of the product is so pronounced that we believe it is impractical to carry out the sulfonation above this point, or even at this point to produce the same product as is obtainable at the lower temperatures.

We have further found that the sulfonic acid can be isolated from the sulfonation mass in a novel manner for this type of product. The sulfonic acid appears to be technically separable from the sulfuric acid directly in various acid strengths.

In 10% sulfuric acid, or below, however, the free sulfonic acid is highly soluble and cannot be separated except by extracting with a non-miscible solvent. At above 90% concentration of sulfuric acid, although, the sulfonic acid is fairly insoluble in the sulfuric acid, such a large amount of sulfuric acid is present in the sulfonic acid layer that the amount of alkali required is greater than should be necessary for the neutralization of the sulfonic acid only, with the result that the final product is quite highly contaminated with sulfuric acid salts. We prefer to make our separation in a concentration of approximately 50% sulfuric acid, since under these conditions, a good quantity of the sulfonic acid is obtained and, furthermore, only a small amount of sulfuric acid is retained in the resulting product.

A preferred embodiment of the process is illustrated by the following example in which parts by weight are given.

*Example.*—1000 parts of sulfuric acid (monohydrate) are cooled to 10° C. and, while stirring, 500 parts of abietene are added over a period of 2 hours. The mass is maintained at a temperature of from 0 to 15° C. and stirred for an additional 20 hours at about that temperature. At the end of that time it is poured into 1000 parts of water. Separation of the two layers can be made while hot, but it is preferred to let the mass cool to room temperature before separating the layers. The dilute sulfuric acid layer is then separated from the sulfonic acid layer (upper layer). The sulfuric acid is discarded. The sulfonic acid is in the form of a dark paste. It is dissolved in water and neutralized with caustic soda solution. This neutral solution comprising the sodium salt is filtered and the filtrate evaporated to dryness whereupon a tan colored product is obtained. This product upon analysis was found to contain an amount of sulphur equal to 9.4% by weight of the compound. Upon deducting the amount of sulphur present as sodium sulphate it may be calculated that there are 7.89% sulphur remaining for the organic compound. The dry product may be ground and is non-hygroscopic. The sulfonic acid of this product is very soluble in water, a 40% solution being readily formed.

If in the above process other neutralizing agents are used, i. e., sodium carbonate, potassium hydroxide, ammonium hydroxide, etc., the corresponding water soluble salts are obtained. The metals of the alkali group give water soluble salts and in this form may be readily handled and employed in various industries.

Other ratios of reacting materials may be employed in the above example. It is also possible to reverse the addition procedure, that is, the sulfuric acid may be added to the abietene.

Alternatively, but not a preferred method, the sulfonation mass above prepared may be added to water and then either used as such or the aqueous solution may be neutralized with basic material such as caustic soda, potassium carbonate, ammonium hydroxide and the like. The solution of neutralized material may be used as such or it may be evaporated to dryness.

We are aware that many changes may be made, and numerous details of construction may be varied through a wide range without departing from the principles of this invention, and we, therefore, do not purpose limiting the patent granted hereon, otherwise than necessitated by the prior art.

We claim as our invention:

1. The process which comprises treating abietene with sulfuric acid at temperatures below 75° C.

2. The process of preparing a water soluble product of abietene which comprises treating abietene with sulfuric acid at temperatures below 75° C. and recovering the product.

3. The process of preparing a sulfonic acid of abietene, which comprises treating abietene with sulfuric acid at a temperature between 0 and 75° C., and separating the resulting product from the excess of sulfuric acid.

4. The process of preparing a sulfonic acid of abietene, which comprises treating abietene with sulfuric acid at a temperature between 0 and 15° C., diluting the sulfonation mass to form layers, one of said layers containing a sulfonic acid of abietene, and separating said layer.

5. The process of preparing a sulfonic acid of abietene, which comprises treating abietene with sulfuric acid monohydrate at a temperature ranging from 0 to 50° C., diluting the mass with water and separating the sulfonic acid from the excess sulfuric acid.

6. Process of preparing a sulfonic acid of abietene, which comprises treating abietene with sulfuric acid, monohydrate at a temperature ranging from 0 to 50° C., for a period of about twenty hours, adding water to the reaction mass to dilute the sulfuric acid to from 10 to 90% strength, separating the layers so formed and recovering the sulfonic acid of abietene from one of said layers.

7. Process of preparing a sulfonic acid of abietene, which comprises treating abietene with sulfuric acid monohydrate at a temperature ranging from 0 to 15° C., for a period of about twenty hours, adding water to the reaction mass to dilute the sulfuric acid to approximately 50% strength, and mechanically separating the layers thus formed.

8. In a process of preparing a sulfonic acid of abietene wherein abietene is treated with sulfuric acid at a temperature ranging from 0 to 75° C., the steps of separating the sulfonic acid from the excess sulfuric acid which comprises adding water to the reaction mass to dilute the sulfuric acid to a strength of from 10 to 90%, and mechanically separating the layers thus formed.

9. A process as in claim 6, wherein the sulfuric acid in the reaction mass is diluted to approximately 50% strength.

10. As new products of manufacture, sulfonic acid compounds of abietene of the type abietene—$SO_3M$, wherein M is hydrogen, ammonia or an alkali metal, said sulfonic acids being substantially identical with the product obtainable by the treating abietene with sulphuric acid at a temperature ranging from 0 to 75° C.

11. As a new product of manufacture, a water soluble salt of abietene sulfonic acid.

12. As a new product of manufacture the sodium salt of abietene sulfonic acid.

13. As new products of manufacture, water soluble salts of abietene sulfonic acid, said salts being non-hygroscopic.

14. As new products of manufacture, water soluble salts of abietene sulfonic acid, containing sulphur in excess of 7% by weight of the salt.

15. As a new product of manufacture, a sodium salt of abietene sulfonic acid, containing approximately 7.89% by weight of sulphur.

16. As a new product of manufacture, a sodium salt of abietene sulfonic acid, which may be prepared by treating abietene with sulfuric acid at a temperature ranging from 0 to 75° C. and neutralizing with a sodium containing agent.

In testimony whereof, we have hereunto subscribed our names at Carrollville, Milwaukee County, Wisconsin.

CLYDE O. HENKE.
HENRY J. WEILAND.